United States Patent
Doney et al.

(10) Patent No.: US 9,400,813 B2
(45) Date of Patent: Jul. 26, 2016

(54) DATA ALIGNMENT TECHNOLOGY

(71) Applicant: International Business Machines Corporation, Armonk, NY (US)

(72) Inventors: Gary C. Doney, Sunnyvale, CA (US); Ryan Pham, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 13/964,075

(22) Filed: Aug. 10, 2013

(65) Prior Publication Data

US 2014/0006366 A1 Jan. 2, 2014

Related U.S. Application Data

(63) Continuation of application No. 12/604,250, filed on Oct. 22, 2009, now Pat. No. 8,612,887.

(51) Int. Cl.
*G06F 3/048* (2013.01)
*G06F 17/30* (2006.01)

(52) U.S. Cl.
CPC .... *G06F 17/30309* (2013.01); *G06F 17/30595* (2013.01)

(58) Field of Classification Search
None
See application file for complete search history.

(56) References Cited

U.S. PATENT DOCUMENTS

| | | | |
|---|---|---|---|
| 5,950,210 A | 9/1999 | Nelson | |
| 6,915,305 B2* | 7/2005 | Subramanian | G06F 17/30383 |
| 7,010,546 B1* | 3/2006 | Kolawa | G06F 11/3688 |
| | | | 707/694 |
| 8,612,887 B2 | 12/2013 | Doney | |
| 2003/0197732 A1 | 10/2003 | Gupta | |
| 2004/0073565 A1* | 4/2004 | Kaufman | G06F 17/30572 |
| 2006/0136471 A1 | 6/2006 | Ge | |
| 2008/0016026 A1 | 1/2008 | Farber | |
| 2008/0133491 A1 | 6/2008 | Iwao | |
| 2008/0282189 A1* | 11/2008 | Hofmann | G06F 17/202 |
| | | | 715/793 |

OTHER PUBLICATIONS

IBM Main Idea for Disclosure SVL8-2008-0325, published early Jan. 2009, "A Method and Apparatus for Temporal Comparison and Validation of Heterogeneous Relational Database Objects and their Relationships".
Aqua Data Studio, "AquaFold," http://www.aquafold.com/.
Aqua Data Studio 7.0, AquaFold, New Features and Documentation Section 20.5, 2008, http://www.aquafold.com/, http://docs.aquafold.com/ads/7.0/3CBCEFE2-BFFE-E697-449E-C59C43E55475.html.

(Continued)

*Primary Examiner* — Anil N Kumar
(74) *Attorney, Agent, or Firm* — Anthony V. S. England; Terry J. Carroll

(57) ABSTRACT

Correspondence is determined among i) groups in a first version of one or more groups of related tables and ii) groups in a second version of one or more groups of related tables. The tables have schema and table names and determining the correspondence includes matching groups that have matching tables, wherein the matching tables have matching schema and table names. A user interface is displayed, including first and second portions. A group name list is displayed for the one or more groups of the first version in the first user interface portion and of the second version in the second portion. A list of one or more tables within each respectively displayed group is displayed. Within each group of the first version the one or more table names are in visual alignment with respective matching one or more table names of the respective corresponding group of the second version.

18 Claims, 8 Drawing Sheets

(56) References Cited

OTHER PUBLICATIONS

"SQLDBCompare," Best SoftTool, Inc., Nov. 3, 2008, http://bestsofttool.com/SQLDBCompare/SDC_Feature.aspx.

"SQLDBCompare," V.2.4, Best SoftTool, Inc., Apr. 25, 2007, http://bestsofttool.com/Home.aspx, http://bestsofttool.com/SQLDBCompare/SDC_Feature.aspx, http://bestsofttool.com/SQLDBCompare/Help/CompareDataOfSameTables.htm.

IBM Optim Database Relationship Analyzer User's Guide, Version 1, Release 1, 2008.

U.S. Appl. No. 12/604,250_Mar. 20, 2012_Non-Final Rejection.

U.S. Appl. No. 12/604,250_Oct. 5, 2012_Final Rejection.

Aug. 15, 2013_U.S. Appl. No. 12/604,250_NOA.

\* cited by examiner

VERSION COMPARISON

VIEW THE DIFFERENCES BETWEEN DIFFERENT VERSIONS OF YOUR GROUPS. YOU CAN VIEW THE TABLES THAT HAVE BEEN ADDED OR DELETED AS A RESULT OF THE GROUP DISCOVERY PROCESS.

422 — DEFAULTVERSION_2  420

| Group Name | Comments | Schema Name | Table Name |
|---|---|---|---|
| GROUP1 | Group | | |
| | Starting Point | DONEYGC | TABLE1 |
| | | DONEYGC | MTABLE1 |
| | | DONEYGC | MTABLE2 |
| GROUP2 | Group | | |
| | Starting Point | DONEYGC | TABLE2 |
| | Deleted | DONEYGC | DTABLE7 |
| | | DONEYGC | MTABLE3 |
| GROUP3 | Group | | |
| | Starting Point | DONEYGC | TABLE3 |
| | | DONEYGC | MTABLE4 |
| GROUP4 | Group | | |
| | Starting Point | DONEYGC | TABLE4 |
| | Deleted | DONEYGC | DTABLE9 |
| GROUP5 | Group | | |
| | Starting Point | DONEYGC | TABLE5 |
| GROUP6 | Group | | |
| | Starting Point | DONEYGC | TABLE6 |
| GROUP7 | Group | | |
| | Starting Point | DONEYGC | TABLE7 |
| GROUP8 | Group | | |
| | Starting Point | DONEYGC | TABLE8 |

430 →  432  DEFAULTVERSION_3

| Group Name | Comments | Schema Name | Table Name |
|---|---|---|---|
| GROUP1 | Starting Point | DONEYGC | TABLE1 |
| | Added | DONEYGC | ATABLE7 |
| | | DONEYGC | MTABLE1 |
| | | DONEYGC | MTABLE2 |
| GROUP2 | Starting Point | DONEYGC | TABLE2 |
| | | DONEYGC | MTABLE3 |
| GROUP3 | Starting Point | DONEYGC | TABLE3 |
| | | DONEYGC | MTABLE4 |
| GROUP4 | Starting Point | DONEYGC | TABLE4 |
| GROUP5 | Starting Point | DONEYGC | TABLE5 |
| | Added | DONEYGC | ATABLE9 |
| GROUP6 | Starting Point | DONEYGC | TABLE6 |
| | | DONEYGC | MTABLE6 |
| GROUP7 | Starting Point | DONEYGC | TABLE7 |
| GROUP8 | Starting Point | DONEYGC | TABLE8 |

443

☑ HIGHLIGHT STARTING POINT TABLES  ☑ HIGHLIGHT ADDED TABLES
☐ HIDE SIMILARITIES  ☑ HIGHLIGHT DELETED TABLES
442  445  444

☐ ALIGN TO  ○ LEFT  ● RIGHT

[CLOSE]  [HELP]

● YELLOW HIGHLIGHTING  ● GREEN HIGHLIGHTING  ● BLUE HIGHLIGHTING

VERSION COMPARISON

VIEW THE DIFFERENCES BETWEEN DIFFERENT VERSIONS OF YOUR GROUPS. YOU CAN VIEW THE TABLES THAT HAVE BEEN ADDED OR DELETED AS A RESULT OF THE GROUP DISCOVERY PROCESS.

522 — DEFAULTVERSION_1   524

| Group Name | Comments | Schema Name | Table Name |
|---|---|---|---|
| GROUP1 | Group | | |
|  | Starting Point | DONEYGC | TABLE1 |
|  |  | DONEYGC | MTABLE1 |
|  |  | DONEYGC | MTABLE2 |
| GROUP2 | Group | | |
|  | Starting Point | DONEYGC | TABLE2 |
|  | Deleted | DONEYGC | DTABLE7 |
|  |  | DONEYGC | MTABLE3 |
| GROUP3 | Group | | |
|  | Starting Point | DONEYGC | TABLE3 |
|  |  | DONEYGC | MTABLE4 |
| GROUP4 | Group | | |
|  | Starting Point | DONEYGC | TABLE4 |
|  | Deleted | DONEYGC | DTABLE9 |
|  |  | DONEYGC | MTABLE5 |
| GROUP5 | Group | | |
|  | Starting Point | DONEYGC | TABLE6 |
|  |  | DONEYGC | MTABLE6 |
| GROUP6 | Group | | |
|  | Starting Point | DONEYGC | TABLEX |
| GROUP7 | Group | | |
|  | Starting Point | DONEYGC | TABLE8 |
|  |  | DONEYGC | MTABLE7 |
| GROUP8 | Group | | |

530 —— 532 —— DEFAULTVERSION_4

| Group Name | Comments | Schema Name | Table Name |
|---|---|---|---|
| GROUP1 | | | |
|  | Starting Point | DONEYGC | TABLE8 |
|  | Starting Point | DONEYGC | TABLE1 |
|  | Added | DONEYGC | ATABLE7 |
|  |  | DONEYGC | MTABLE1 |
|  |  | DONEYGC | MTABLE2 |
|  |  | DONEYGC | MTABLE7 |
| GROUP2 | | | |
| GROUP3 | | | |
|  | Starting Point | DONEYGC | TABLE7 |
|  | Starting Point | DONEYGC | TABLE2 |
|  |  | DONEYGC | MTABLE3 |
|  |  | DONEYGC | TABLE6 |
|  |  | DONEYGC | TABLE3 |
|  |  | DONEYGC | MTABLE4 |
|  |  | DONEYGC | MTABLE6 |
| GROUP4 | | | |
|  | Starting Point | DONEYGC | TABLE5 |
|  | Starting Point | DONEYGC | TABLE4 |
|  | Added | DONEYGC | ATABLE9 |

546

☑ HIGHLIGHT STARTING POINT TABLES  ☑ HIGHLIGHT ADDED TABLES  ☐ ALIGN TO ○ LEFT ● RIGHT
☐ HIDE SIMILARITIES  ☑ HIGHLIGHT DELETED TABLES

○ YELLOW HIGHLIGHTING  ○ GREEN HIGHLIGHTING  ○ BLUE HIGHLIGHTING

[CLOSE]  [HELP]

FIG. 6

VERSION COMPARISON

VIEW THE DIFFERENCES BETWEEN DIFFERENT VERSIONS OF YOUR GROUPS. YOU CAN VIEW THE TABLES THAT HAVE BEEN ADDED OR DELETED AS A RESULT OF THE GROUP DISCOVERY PROCESS.

DEFAULTVERSION_1  724  ← 720

| Group Name | Comments | Schema Name | Table Name |
|---|---|---|---|
| GROUP1 | Group | | |
| | Starting Point | DONEYGC | TABLE1 |
| | | DONEYGC | MTABLE1 |
| | | DONEYGC | MTABLE2 |
| GROUP2 | Group | | |
| | Starting Point | DONEYGC | TABLE2 |
| | | DONEYGC | MTABLE3 |
| | Deleted | DONEYGC | DTABLE7 |
| GROUP3 | Group | | |
| | Starting Point | DONEYGC | TABLE3 |
| | Deleted | DONEYGC | MTABLE4 |
| GROUP4 | Group | | |
| | Starting Point | DONEYGC | TABLE4 |
| | | DONEYGC | DTABLE9 |
| GROUP5 | Group | | |
| | Starting Point | DONEYGC | TABLE5 |
| GROUP6 | Group | | |
| | Starting Point | DONEYGC | TABLE6 |
| | | DONEYGC | MTABLE6 |
| GROUP7 | Group | | |
| | Starting Point | DONEYGC | TABLE7 |
| GROUP8 | Group | | |
| | Starting Point | DONEYGC | TABLE8 |
| | | DONEYGC | MTABLE7 |

DEFAULTVERSION_4  ─ 734
730 →

| Group Name | Comments | Schema Name | Table Name |
|---|---|---|---|
| GROUP1 [1] | Group | | |
| | Starting Point | DONEYGC | TABLE1 |
| | | DONEYGC | MTABLE1 |
| | | DONEYGC | MTABLE2 |
| GROUP2 [1] | Group | | |
| | Starting Point | DONEYGC | TABLE2 |
| | | DONEYGC | MTABLE3 |
| GROUP3 [1] | Group | | |
| | Starting Point | DONEYGC | TABLE3 |
| GROUP4 [1] | Group | | |
| | Starting Point | DONEYGC | TABLE4 |
| | | DONEYGC | MTABLE4 |
| GROUP4 [2] | Group | | |
| | Starting Point | DONEYGC | TABLE5 |
| | Added | DONEYGC | ATABLE9 |
| GROUP3 [2] | Group | | |
| | Starting Point | DONEYGC | TABLE7 |
| | | DONEYGC | MTABLE6 |
| GROUP2 [2] | Group | | |
| | Starting Point | DONEYGC | TABLE2 |
| GROUP1 [2] | Group | | |
| | Starting Point | DONEYGC | TABLE8 |
| | | DONEYGC | MTABLE7 |
| | Added | DONEYGC | ATABLE7 |

747 — ⊙ LEFT
☐ ALIGN TO   ○ RIGHT

☑ HIGHLIGHT STARTING POINT TABLES    ☑ HIGHLIGHT ADDED TABLES    [CLOSE]
☐ HIDE SIMILARITIES    ☑ HIGHLIGHT DELETED TABLES    [HELP]

● YELLOW HIGHLIGHTING    ◐ GREEN HIGHLIGHTING    ◑ BLUE HIGHLIGHTING

*FIG. 7*

DATA ALIGNMENT TECHNOLOGY

CROSS REFERENCE TO RELATED APPLICATION

This is a continuation of, and hereby claims the benefit of the priority date of, application Ser. No. 12/604,250, which was filed Oct. 22, 2009.

BACKGROUND

The present invention relates to a user interface for displaying relationships among tables, and more particularly for displaying two sets of one or more groups of related tables in ways that visually depict relations between the two sets.

Tools exist that analyze user databases and discover relationships among tables in the databases. IBM's Optim Database Relationship Analyzer ("DRA") is one such tool. DRA enables users to run repeated, iterative discoveries on their databases. Respective results of these discoveries are made up of one or more groups of related tables. A set of one or more groups of related tables identified by a discovery run is referred to herein as a "version" of the groups or of the tables.

DRA presents versions to a user in order to facilitate user examination. Also, since other tools exist for which it is useful to know relationships among database tables, presentation of versions also facilitates use of database tables with these other tools.

DRA provides some capability for users to view differences among the versions, which enables users to see how database tables and relationships among the tables have changed over time. DRA users view these differences in a visual compare window within the tool by selecting two versions the user would like to compare.

SUMMARY OF THE INVENTION

A method for aligning tables is provided, according to one form of an embodiment of the invention. The method includes determining, using a microprocessor, correspondence among i) groups in a first version of one or more groups of related tables and ii) groups in a second version of one or more groups of related tables. The tables have schema and table names. The determining correspondence among groups in the first and second versions includes matching groups that have matching tables, wherein the matching tables have matching schema and table names. A user interface is displayed on a display device, which includes displaying first and second portions of the user interface. The displaying also includes displaying a group name list that is displayed for the one or more groups of the first version in the first user interface portion, displaying a group name list for the one or more groups of the second version in the second user interface portion, and displaying a table name list of one or more tables within each respectively displayed group, wherein within each group of the first version the one or more table names are in visual alignment with respective matching one or more table names of the respective corresponding group of the second version.

In another aspect, the method includes identifying as an added table, using the microprocessor, each table in the second version that does not have a corresponding table in the first version. For each added table in the second version, padding is displayed in the table name list in the corresponding group of the first version opposite the listed name of the added table in the second version, so that each added table listed within its group of the second version is displayed in visual alignment with padding in the corresponding group of the first version.

In another aspect, the method includes identifying as a new group, using the microprocessor, each group in the second version that does not have a corresponding group in the first version, and displaying each new group below the rest of the group and table names listed in the second version.

In another aspect, the method includes identifying as a deleted table, using the microprocessor, each table in the first version that does not have a corresponding table in the second version, and, for each deleted table in the first version, displaying padding in the table name list in the corresponding group of the second version opposite the listed name of the deleted table in the first version, so that each deleted table listed within its group of the first version is displayed in visual alignment with padding in the corresponding group of the second version.

In another aspect, the method includes identifying as a deleted group, using the microprocessor, each group in the first version that does not have a corresponding group in the second version, displaying each deleted group below the rest of the group and table names listed in the second version.

In another aspect, the method includes displaying in a certain manner responsive to user selection of the first version for governing the aligning of the tables. This manner of displaying includes displaying the group names in a predetermined sequence in the first portion of the user interface and displaying the group names in the second portion of the user interface in visual alignment with the respective names of the corresponding groups listed in the first portion. Further, if a group in the second portion of the user interface corresponds to multiple groups in the first portion of the user interface then the displaying of the group names in the second portion includes segmenting a group in the second portion of the user interface into group segments and displaying each segment in the second portion of the user interface in visual alignment with the segment's corresponding group in the first portion of the user interface.

In another aspect, the method likewise includes displaying in another certain manner responsive to user selection of the second version for governing the aligning of the tables. This other manner of displaying includes displaying the group names in a predetermined sequence in the second portion of the user interface and displaying the group names in the first portion of the user interface in visual alignment with the respective names of the corresponding groups listed in the second portion. Further, if a group in the first portion of the user interface corresponds to multiple groups in the second portion of the user interface then the displaying of the group names in the first portion includes segmenting a group in the first portion of the user interface into group segments and displaying each segment in the first portion of the user interface in visual alignment with the segment's corresponding group in the second portion of the user interface.

In other forms of the invention, systems and computer program products are provided.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an exemplary depiction of a user interface showing side-by-side views of two versions of tables in table groupings, where the groups and tables are unaligned, according to an embodiment of the invention.

FIG. 5 illustrates the user interface of FIG. 4, also showing unaligned, side-by-side views of two versions of tables in table groupings, but with a different set of tables and table groupings having a more dissimilar structure than in the instance illustrated in FIG. 4, according to an embodiment of the invention.

FIG. 6 illustrates the user interface of FIGS. 4 and 5, with a different set of tables and table groupings having a still more dissimilar structure than in the instances illustrated in FIGS. 4 and 5, but wherein the side-by-side views of the two versions have the tables and table groupings aligned, according to an embodiment of the invention.

FIG. 7 illustrates the user interface and tables and table groupings of FIG. 6, with the side-by-side views having the alignment of the tables and table groupings governed by a different side than in FIG. 6, according to an embodiment of the invention.

DETAILED DESCRIPTION

Figure 1:
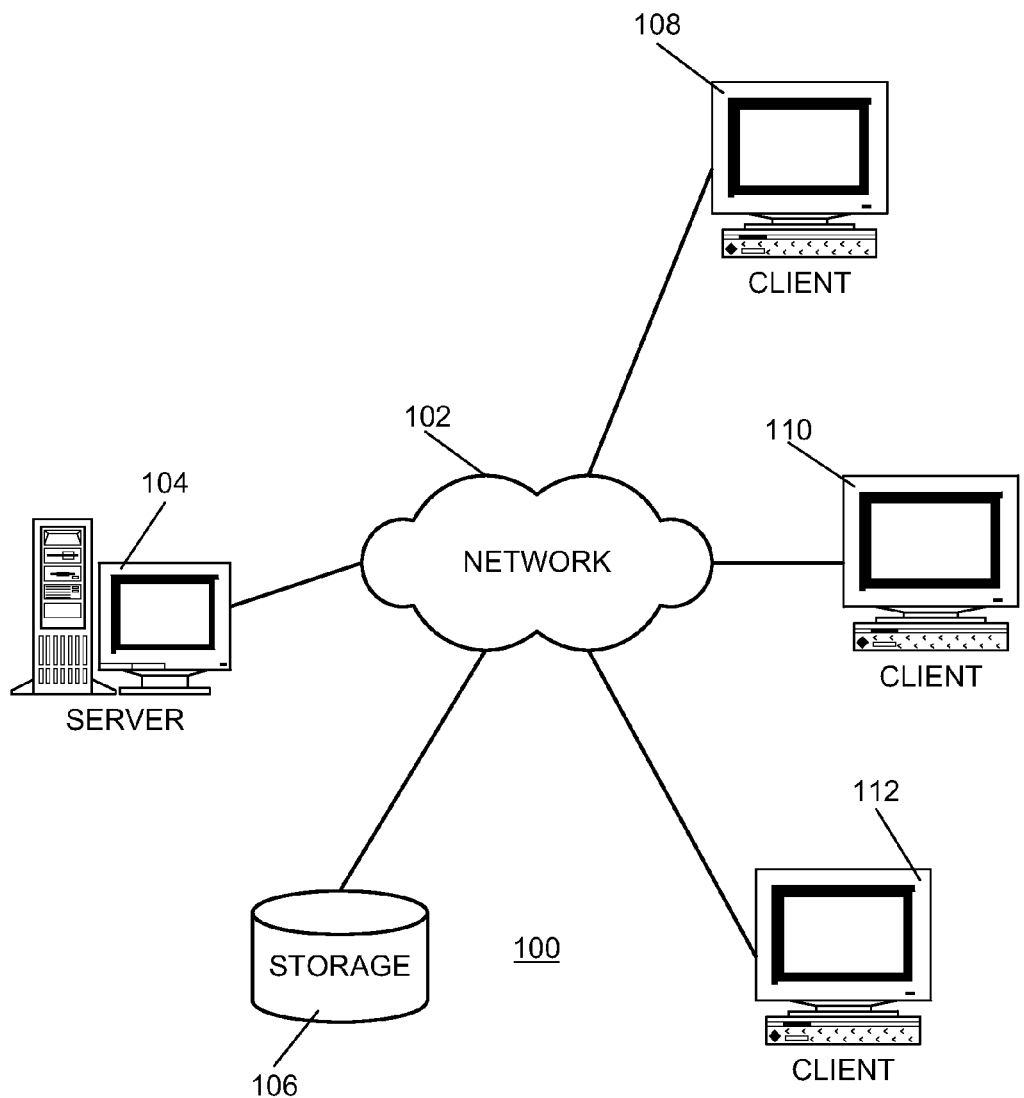
FIG. 1 is an exemplary block diagram illustrating a distributed data processing system according to an embodiment of the invention.

The present invention involves a recognition that a problem arises when comparing sets of database table groupings, i.e., sets such as DRA "versions" in one embodiment of the invention. This problem occurs because relative compositions of the sets can change over time, making it difficult to easily view and compare their differences. The prior art DRA comparison window mitigates this problem somewhat by providing viewing capabilities that highlight added and deleted tables. However, it remains difficult to compare first and second sets of database table groupings in some situations where group composition has changed such that the two sets do not lend themselves to side-by-side visual alignment of the groups. This difficulty is particularly hard to resolve if the groups merge or split, resulting in different numbers of groups in the two sets.

Herein the term "version" is not limited to sets of database table groupings that are produced, analyzed or displayed by DRA. Correspondingly, the term "version" may be used interchangeably with the term "set." The terms "first version" and "second version" may be used herein to convey that a set of database table groupings in a first version have at least some aspects in common with that of a second version. For example, a second set of database table groupings in the second version may include at least some of the tables or groups of the first version, possibly with changes in size or composition of the groups relative to the first version.

An embodiment of the present invention further involves a recognition that there is a need for a new way to align contents of two versions in a comparison view, so that the user can easily see what has changed from one version to the next. An embodiment of the present invention addresses this need. In one aspect, it does so by providing visual alignment of tables, groups of tables or portions of the tables of a group, which enables users to easily compare groups in a more direct way, even if the groups have merged, split, or otherwise changed over time.

In particular, in an embodiment of the present invention a computer program executing on a computer system provides the following version comparison capabilities:

1. Presents a display of a first version of database table groupings side-by-side with a second version, which includes at least some of the tables or groups of the first version, but with changes in size or composition relative to the first version. In the side-by-side display aspects of the tables and groups in the two versions are visually aligned. This enables easy comparison of corresponding tables and groups in the two versions, which may represent the states of tables or groups that arose from two different operations or at two different times.
2. Presents the side-by-side display in an alignment frame-of-reference based on the first version or else an alignment frame-of-reference based on the second version, the selection of which may be responsive to user input.
3. Toggles the display between aligned and unaligned formats responsive to user input. This provides additional visual cues to the user as to how group composition has changed over time, which facilitates comparison of versions.

FIG. 4 illustrates a presentation of a comparison between two versions, according to an embodiment of the present invention in which the presentation is caused by a computer program executing on a computer system. In the illustrated instance, the system presents the comparison without using a certain group alignment viewing feature of the program. That is, FIG. 4 illustrates a base capability in which users perform visual comparison without the alignment viewing capability. This is not particularly problematic in the selected instance shown in FIG. 4, since the groups of related tables in each version have similar structures.

More specifically, in the example shown in FIG. 4, the computer system executing the computer program performs an initial group discovery, which may be responsive to a user command, and responsively returns a first version having eight different groups of related tables. Upon a subsequent group discovery, which may also be responsive to a user command, the system returns a second version and presents the two versions to the user side-by-side on view 410, with the older, first version shown in a left-hand portion 420 of view 410 and the newer, second version shown in a right-hand portion 430 of view 410. In the illustrated embodiment of the invention, the system matches groups that contain tables with the same schema and table name.

As shown in portion 430, both versions contain eight particular groups, GROUP1 through GROUP8, but in the second version tables in some of the groups have been added and tables in some of the groups have been deleted relative to the first version. Because the numbers of tables of the groups in the two versions are not greatly dissimilar and because the particular tables included in the two versions are not greatly dissimilar, unaligned side-by-side viewing as shown in FIG. 4 enables the user to fairly easily see differences between the two versions, even though there is some misalignment between the two versions due to the changes in the second version relative to the first version.

In each portion 420 and 430 of view 410, there are tables in the groups that anchor the respective groups, which are referred to as "starting point tables." In the illustrated embodiment of the invention, the starting point tables are indicated by "starting point" in the "Comments" columns 422 and 432 of respective portions 420 and 430. In the illustrated instance, starting point tables are also highlighted in green, which is a selectable view option 442 at the bottom of view 410, the user can compare groups between the two versions by looking for the corresponding starting point tables. In the illustrated instance, added tables are highlighted in blue, which is a selectable view option 443 at the bottom of view 410, and deleted tables are highlighted in yellow, which is a selectable view option 444 at the bottom of view 410. Note that there are also other selectable view options at the bottom of view 410, according to the illustrated embodiment of the invention. That is, other selectable view options include "hide similarities" 445, and "align to" 446, which are not enabled in the illustrated instance.

FIG. 5 illustrates a view 510 generated by the computer system executing the computer program, wherein, once again, the alignment viewing feature is not enabled, so that the user must visually compare versions in portions 520 and 530 without the benefit of enhanced alignment of groups or tables within the versions. In the selected instance shown in FIG. 5, this is somewhat more problematic, since the groups in this illustrated instance no longer have similar structures. That is, the older, first version, shown in portion 520 on the left-hand side of view 510, has eight groups, while the newer, second version in portion 530 on the right-hand side of view 510 has only four groups, since some groups have merged. The computer system executing the computer program has determined that the newer version of the tables in the four groups (portion 530) are related to the older version of the tables in the eight groups (portion 520) based on properties of the tables, including table names and table schemas. As can be seen in FIG. 5, all the schema names are the same in the illustrated instance. It should be appreciated, however, that table schemas may also change. In a case where the schema has changed for a table, a discovery function provided by the program may determine that the newer table is not related to the older table of the same name.)

By close inspection of the listed tables, which are identifiable by names in the Table Name columns 524 and 534 of portions 520 and 530 respectively, it is apparent how some of the groups have merged. For example, TABLE8 and TABLE7 have been merged into GROUP1, which is shown in newer version, right hand portion 530, from GROUP8, which is shown in older version, left hand portion 520.

Comparing the contents of the two versions shown in portions 520 and 530 of view 510 is more difficult than in the instance illustrated in FIG. 4. Nevertheless, the groups in FIG. 5 are similar enough that the user can compare versions shown in portions 520 and 530 without enablement of an alignment feature that is provided by an embodiment of the invention and that may be selected by "align to" option 546 in view 510.

Figure 6:
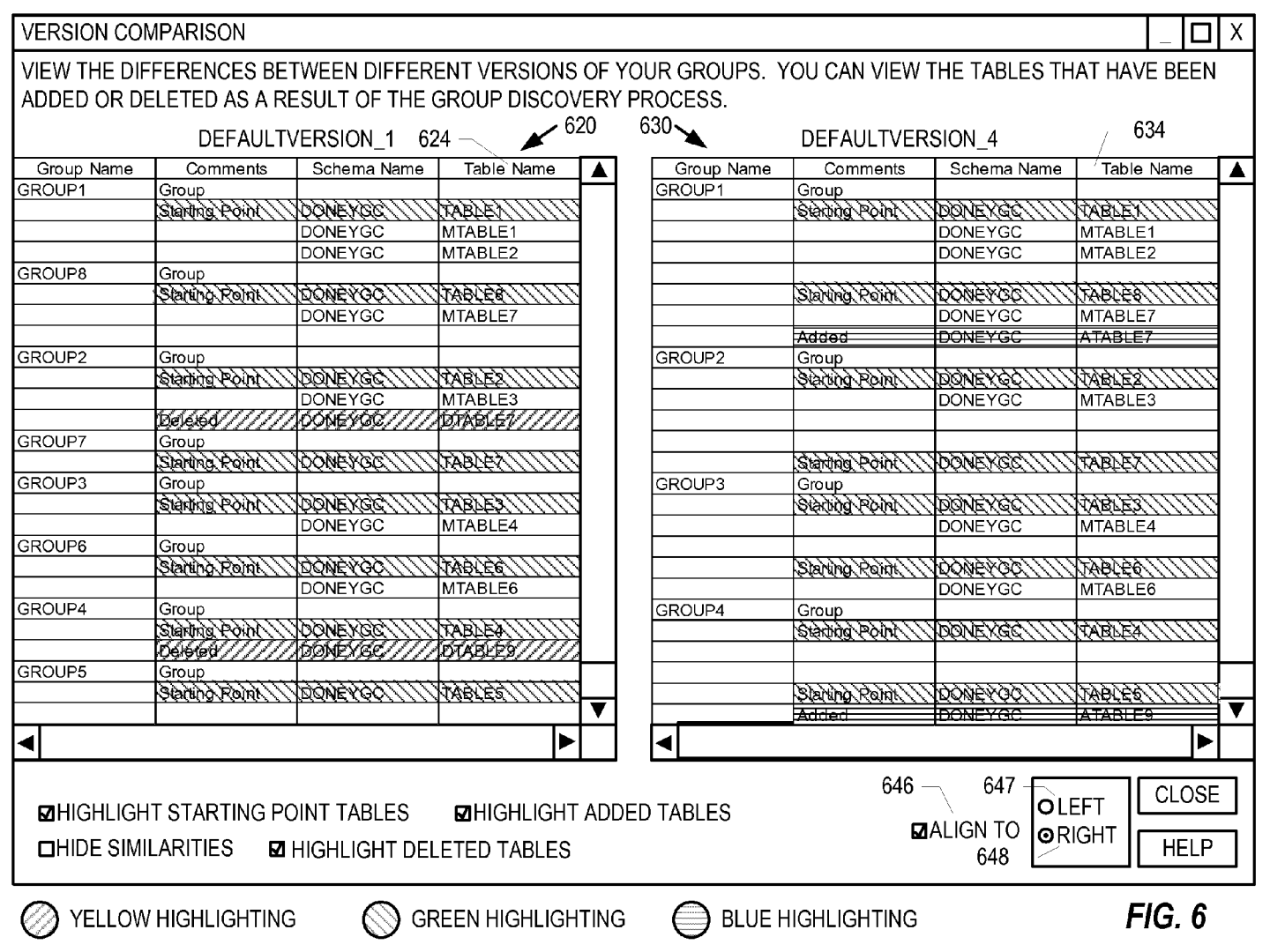

Referring now to FIG. 6, a more complicated example is shown which illustrates how quickly it can become too difficult for a user to understand differences between two versions without the group alignment viewing feature provided by the program, which more explicitly maps differences. FIG. 6 illustrates an enhanced viewing feature, in which group alignment is provided in a version comparison view 610, wherein the computer program executing on the system presents groups in side-by-side portions 620 and 630 in a sequence that aligns corresponding groups in respective versions, according to an embodiment of the present invention.

That is, in view 610 the user has enabled the "align to" option 646, and has selected alignment based on the newer version, i.e., in right-hand portion 630, so that the computer program executing on the computer system has responsively caused the eight groups, GROUP1 through GROUP8, of the first version in portion 620 to be presented in a sequence governed by the name ordered sequence of the groups of the second version. That is, the four groups, GROUP1 through GROUP4, of the second version are presented in alphabetical group name order in portion 630, which is a predetermined order for the groups in portion 630 that is independent of the groups in portion 620. In contrast, the eight groups, GROUP1 through GROUP8, of the first version are presented in a sequence, from top to bottom, GROUP1, GROUP8, GROUP2, GROUP7, GROUP 3, GROUP6, GROUP4 and GROUP5, such that the eight groups of the first version align horizontally in portion 620 responsive to the predetermined vertical positions of the four groups, GROUP1 through GROUP4, of the second version in portion 630. Still more specifically, groups GROUP1 and GROUP8 of the first version, shown in portion 620, align to group GROUP1 in the second version, shown in portion 630, enabling the user to easily see that new group GROUP1 in the second version maps to old groups GROUP1 and GROUP8 of the first version. The groups map in this manner because GROUP1 in the second version includes tables that were in old groups GROUP1 and GROUP8 of the first version.

Likewise, groups GROUP2 and GROUP7 of the first version, shown in portion 620, align to group GROUP2 in the second version, shown in portion 630, enabling the user to easily see that new group GROUP2 in the second version maps to old groups GROUP2 and GROUP7 of the first version. Similarly, groups GROUP3 and GROUP6 of the first version, shown in portion 620, align to group GROUP3 in the second version, shown in portion 630, enabling the user to easily see that new group GROUP3 in the second version maps to old groups GROUP3 and GROUP6 of the first version. Finally, groups GROUP4 and GROUP5 of the first version, shown in portion 620, align to group GROUP4 in the second version, shown in portion 630, enabling the user to easily see that new group GROUP4 in the second version maps to old groups GROUP4 and GROUP5 of the first version.

The display of groups in the particular sequence and alignment described above causes corresponding "old segments" of the new groups to align with the new groups, so to speak. That is, for example, old groups GROUP1 and GROUP8 of the first version are considered "old segments" of new group GROUP1 and align therewith (i.e., with the vertical position of new group GROUP1 determining the vertical positions of old groups GROUP1 and GROUP8). Because of this, the user can more easily see that the new group GROUP1 is derived from old groups GROUP1 and GROUP8, new group GROUP2 is derived from old groups GROUP2 and GROUP7, and so on down the groups shown in view 610.

In addition to aligning groups between portions 620 and 630, the computer program executing on the computer system causes individual tables making up the groups to be presented in alignment as well, further facilitating a user's visual comparison of the groups in the respective versions. That is, tables in each version's portion 620 and 630 of view 610 are identified by table names shown in Table Name columns 624 and 634. The computer program executing on the computer system has caused corresponding tables in each version to be aligned in view 610. For example, the name of table TABLE1 in the version displayed in portion 620 is positioned vertically in response to the position of the name of the same table TABLE1 in the version displayed in portion 630, so that the two TABLE1 tables are in horizontal alignment and so on. (Keep in mind that in the illustrated example, schemas are the same for all tables. In instances where schemas are not all the same, table correspondence depends on schemas of the tables.)

From the above it should be appreciated that the groups of the first version have a predetermined sequence in which the program lists them if they are listed independently of the second version, and vice versa (which is an alphabetical order in the instances illustrated herein and described herein above). Likewise, the tables of the first version have a predetermined sequence in which the program lists them if they are listed independently of the second version, and vice versa. In the instances illustrated herein and described herein above, each group has an anchor table and other tables that are related to the anchor table. When the tables of the first version are listed independently of the second version, for example, the anchor table of each group of the first version is listed first and the rest of the tables of each group of the first version are listed thereafter in alphabetical sequence in the illustrated instance. Note also that with the groups of the first version in their predetermined alphabetical sequence listed independently of the second version, the anchor tables of the groups are also in alphabetical sequence.

FIG. 7 illustrates the same first and second versions shown in FIG. 6, wherein the user has enabled the "align to" option 646, just as in FIG. 6. But in view 710 of FIG. 7, the user has selected left 746 governed alignment, i.e., alignment based on group names of the older version, which are shown in left-hand portion 720. Consequently, the computer program executing on the computer system has responsively caused the eight groups, GROUP1 through GROUP8, of the first version to be presented in portion 720 in name ordered sequence, and has caused the four groups, GROUP1 through GROUP4, of the second version to be split into segments that correspond to groups of the first version and to be presented in a sequence such that they align with their corresponding first version groups.

In particular, since the sequence in which the groups are displayed is governed by left-hand portion 720, group GROUP1 is shown first, i.e., at the top of the list of group names in left-hand portion 720 and group GROUP8 is shown last, i.e., at the bottom, with groups GROUP2 through GROUP7 separating them there between. Further, since new group GROUP1 in the version shown on right-hand portion 730 of view 710 corresponds to old groups GROUP1 and GROUP8 in the version shown on left-hand portion 720, the computer program executing on the computer system has responsively caused the name of new group GROUP1 (shown on right-hand portion 730) to be segmented so that it can align with both old groups GROUP1 and GROUP8 shown on left-hand portion 720. That is, the name of new group GROUP1 (right-hand portion 730) is segmented into a first segment GROUP1[1] and a second segment GROUP1[2], where first segment GROUP1[1] in right-hand portion 730 is aligned with original group GROUP1 in left-hand portion 720, i.e., at the top of the lists of groups (as governed by old group GROUP1), and second segment GROUP1[2] is aligned in right-hand portion 730 with original group GROUP8 in left-hand portion 720, i.e., at the bottom of the lists (as governed by old group GROUP8). It should be appreciated from this example that the group segmentation uses a subscripting notation, i.e., subscript [1] to indicate a first segment and subscript [2] to indicate a second segment.

From the above, it should be appreciated that a user can select a preferred frame-of-reference, "align to left" or "align to right," to help the user see group changes relative to a given point in time. Further, the user can toggle between aligned and unaligned comparison to help the user see the dynamics of the changing structure of the groups as the table schemas and group relationships evolve over time. Also, the user can toggle between the left and right alignment frame of reference to get a more dynamic sense of how the groups of tables have reorganized over time.

Figure 8:
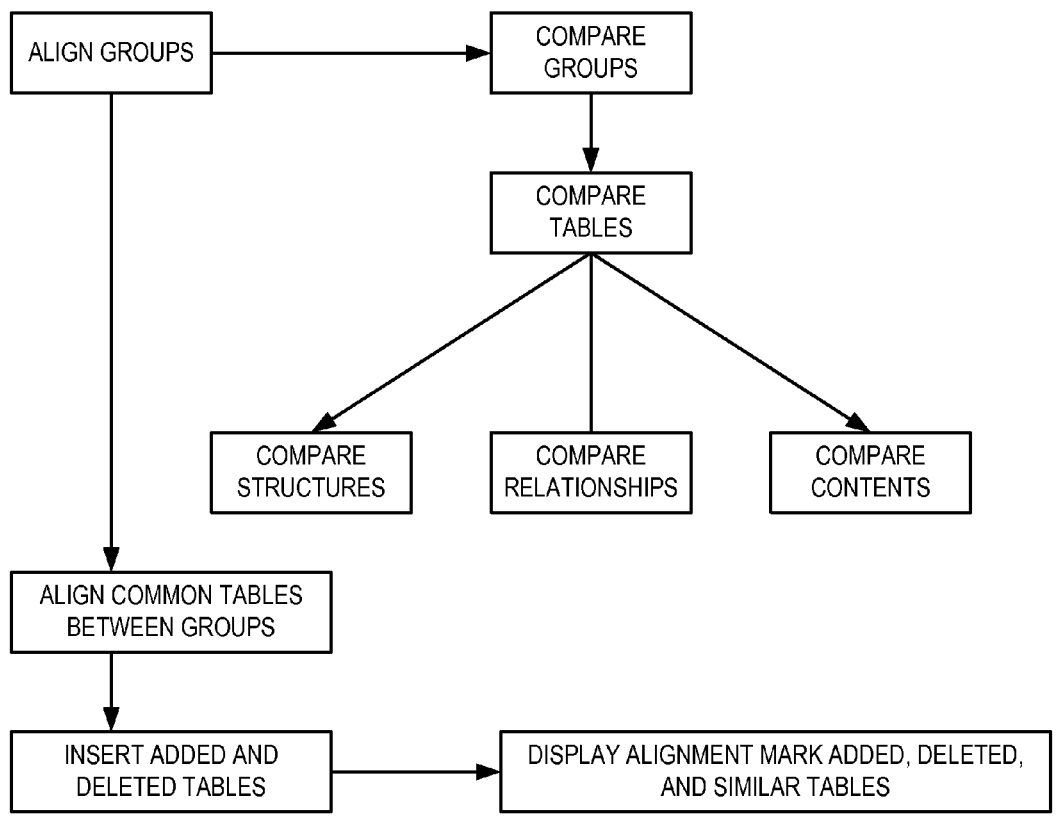
FIG. 8 illustrates control flow of steps performed by a computer program executing on a computer system in aligning two versions of groups of related tables, according to an embodiment of the invention, according to an embodiment of the invention.

FIG. 8 illustrates control flow of steps performed by the computer program executing on the computer system in aligning two versions of groups of related tables, according to an embodiment of the invention.

First, the program determines correspondence 802 among groups of two versions (referring below to "Version1" as an older version and "Version2" as a newer version).

Next, within each corresponding set of groups of the two versions, the program aligns 804 tables and groups that correspond to one another. This means that if Version1 has been selected to govern the alignment, Version1 is the independent version and the program aligns groups of Version2 (the dependent version) to corresponding groups of Version1, where the predetermined sequence of the groups of Version1 governs the sequence in which the groups of Version2 are listed. This also means that the program aligns common tables in Version2 groups to corresponding tables of corresponding groups in Version1, where the predetermined sequence of the tables of Version1 govern the sequence in which the tables are listed in Version2.

Likewise, if Version2 has been selected to govern the alignment, Version2 is the independent version and the program aligns groups of Version1 (the dependent version) to corresponding groups of Version2, where the predetermined sequence of the groups of Version2 governs the sequence in which the groups of Version1 are listed. And for Version2 alignment the program aligns common tables in Version1 groups to corresponding tables of corresponding groups in Version2, where the predetermined sequence of the tables of Version2 governs the sequence in which the tables are listed in Version1.

This also includes the program breaking a group of the dependent version into segments if the group maps to multiple groups in the independent version, which governs alignment. (Groups stay intact in the independent version.)

Next, the program finds 806 added tables, i.e., each table that was added in Version2 but that did not exist in Version1. For each added table, the program inserts 808 the table name into the list of tables of its associated, aligned Version2 group and pads 810 the list of tables in the corresponding Version1 group with an empty entry in the same location, in order to preserve alignment among corresponding tables.

Next, the program finds 812 new groups, i.e., each group that was added in Version2 but that did not exist in Version1. For each new group, the program adds 814 the group to the bottom of its alignment, i.e., the bottom of the list of groups in the Version2 portion of the view. This includes adding the group name and the table and schema names for the tables of each added group.

Next, the program pads 816 the Version1 portion of the view, i.e., adds blank lines corresponding to the lines added in Version2 for listing tables in the new group or groups, in order to preserve alignment of the list of tables and groups in the two versions.

Next, the program finds 818 deleted tables, i.e., each table that was in Version1 but that is not in Version2. For each deleted table, the program inserts 820 the table name into the list of tables of its associated aligned Version1 group and pads 822 the list of tables in the corresponding Version2 group with an empty entry in the same location, in order to preserve the common table alignment.

Next, the program finds 824 deleted groups, i.e., each group that was in Version1 but that is not in Version2. For each deleted group, the program adds 826 the group to the bottom of its alignment, i.e., the bottom of the list of groups in the Version1 portion of the view. This includes adding the group name and the table and schema names for the tables of each deleted group.

Next, the program pads 828 the Version2 portion of the view in order to preserve alignment of the list of tables and groups in the two versions.

As previously mentioned, in the embodiments of the invention illustrated in FIGS. 4-8, the computer program executing on the computer system matches groups that contain tables with the same schema and table name. In another embodiment of the invention, the matching takes table columns (type and size) and relationships into consideration, which enables comparison and alignment based on the structure and content of the tables, rather than just table and schema names. This allows the computer program executing on the computer system to align tables that have been renamed as well as identifying tables that are similar, tables that have been modified between versions (new columns, new relationships, etc.).

With reference now to FIG. 1, a pictorial representation of a network data processing system 100 is presented in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and programs to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Figure 2:
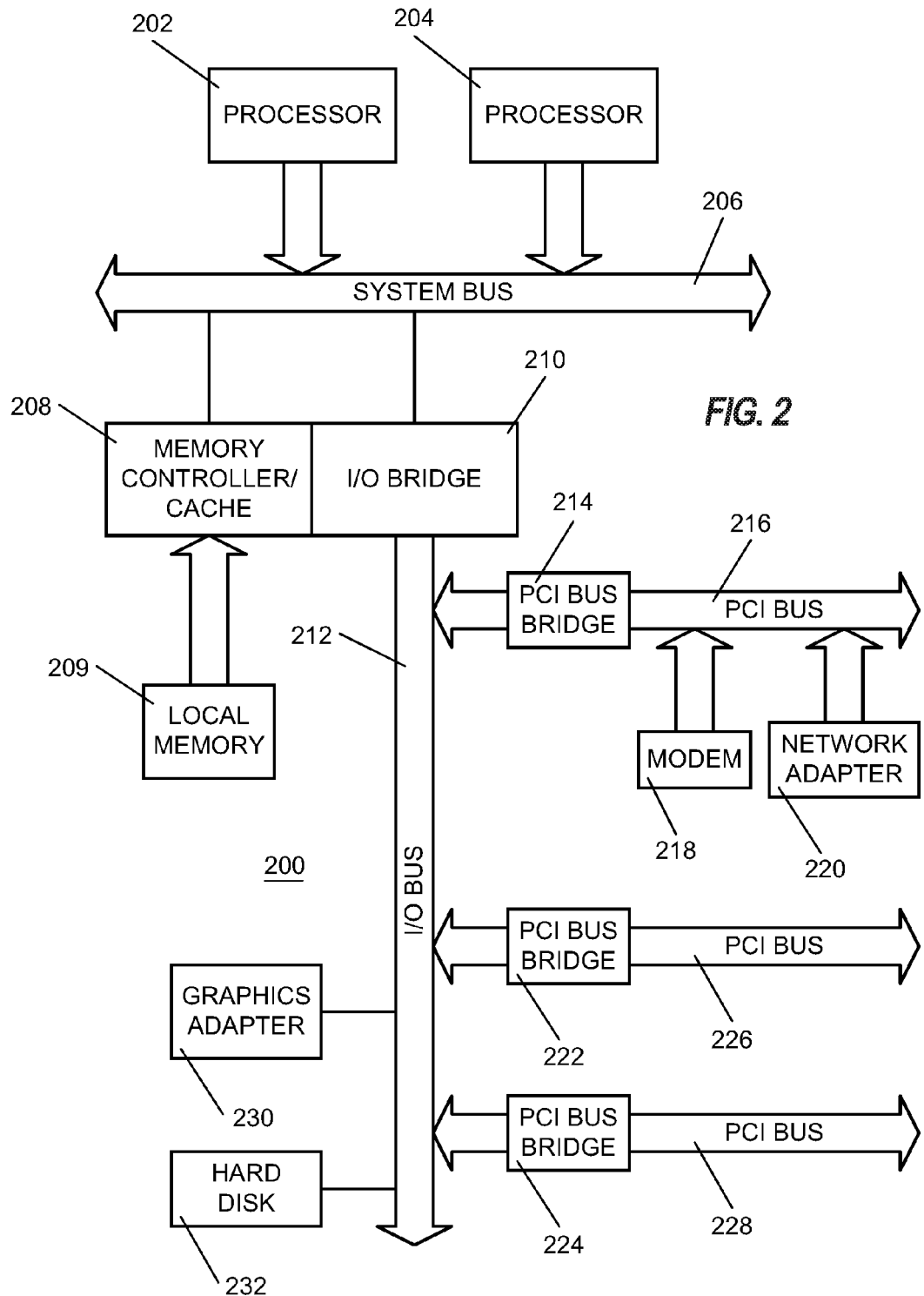
FIG. 2 is an exemplary block diagram of a server apparatus according to an embodiment of the invention.

Referring to FIG. 2, a block diagram of a data processing system that may be implemented as a server, such as server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Server 104 may provide a suitable website or other internet-based graphical user interface accessible by users to enable user interaction for aspects of an embodiment of the present invention. In one embodiment, Netscape web server, IBM Websphere Internet tools suite, an IBM DB2-UDB database platform and a Sybase database platform are used in conjunction with a Sun Solaris operating system platform. Additionally, components such as JBDC drivers, IBM connection pooling and IBM MQ series connection methods may be used to provide data access to several sources. The term webpage as it is used herein is not meant to limit the type of documents and programs that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper programs, plug-ins, and the like.

Figure 3:
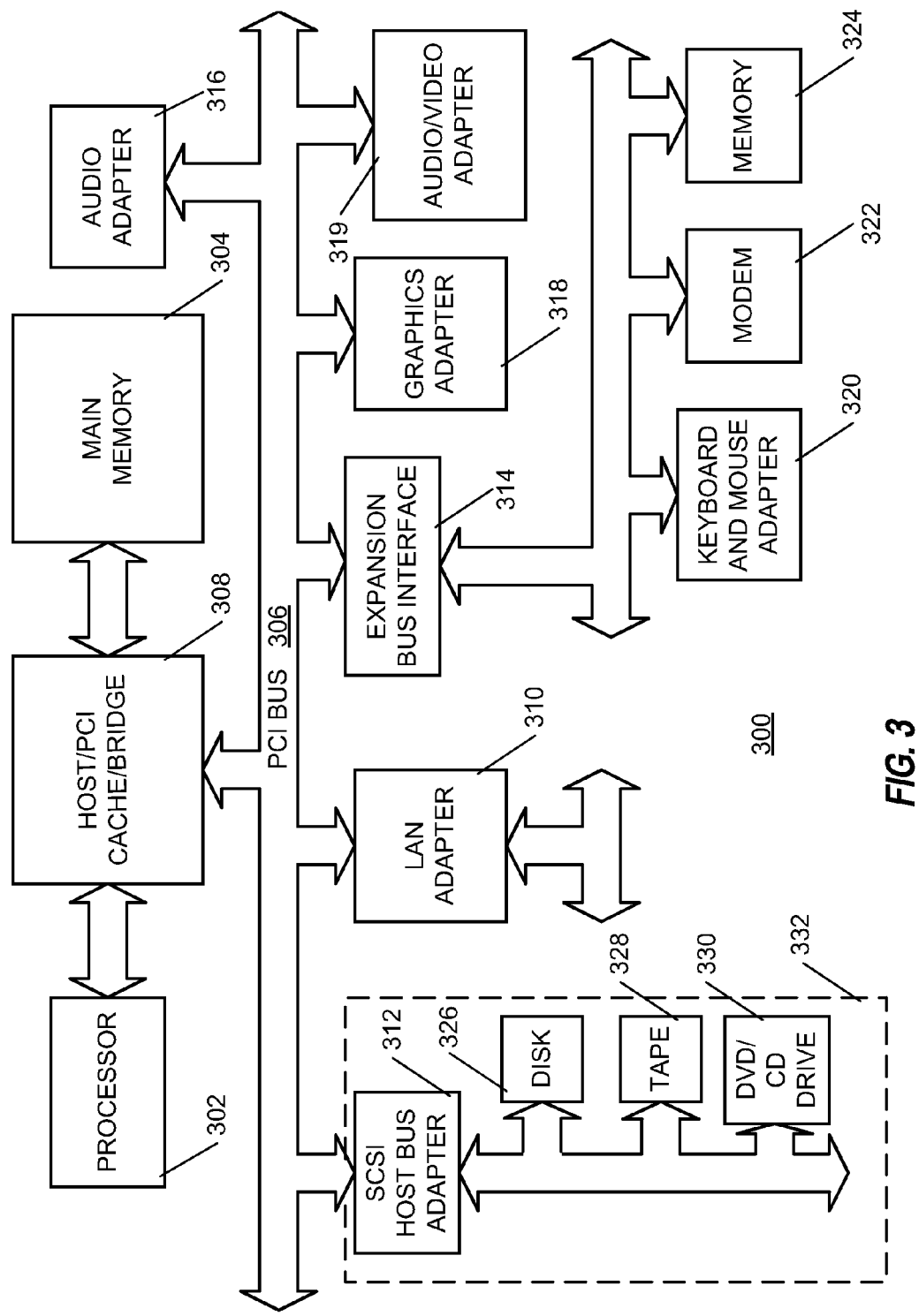
FIG. 3 is an exemplary block diagram of a client apparatus according to an embodiment of the invention.

With reference now to FIG. 3, a block diagram illustrating a data processing system is depicted in which aspects of an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP®, which is available from Microsoft Corporation. An object oriented programming system such as Java may run in conjunction with the operating system and provide calls to the operating system from Java programs or programs executing on data processing system 300. "Java" is a trademark of Sun Microsystems, Inc. Instructions for the operating system, the object-oriented operating system, and programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance. Further, the present invention may reside on any data storage medium (i.e., floppy disk, compact disk, hard disk, tape, ROM, RAM, etc.) used by a computer system. (The terms "computer," "system," "computer system," and "data processing system" and are used interchangeably herein.)

As will be appreciated by one skilled in the art, aspects of the present invention may be embodied as a system, method or program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electro-magnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The flowcharts and block diagrams in the figures illustrate architecture, functionality, and operation of possible implementations of systems, methods and program products according to various embodiments of the present invention. In this regard, each block in the flowcharts or block diagrams may represent a module, segment, or portion of code, which comprises one or more executable program instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Modules implemented in software for execution by various types of processors may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

These program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Computer program code, i.e., instructions, for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These program instructions may also be stored in a computer readable storage medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like. The database may be any type of database, such as relational, hierarchical, object-oriented, and/or the like. Common database products that may be used to implement the databases include DB2 by IBM, any of the database products available from Oracle Corporation, Microsoft Access by Microsoft Corporation, or any other database product. The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Furthermore, the described features, structures, or characteristics of the invention may be combined in any suitable manner in one or more embodiments. Correspondingly, even if features are initially claimed as acting in certain combinations, one or more features from a claimed combination can in some cases be excised from the combination, and the claimed combination can be directed to a subcombination or variation of a subcombination.

In the descriptions herein, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Benefits, advantages and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

Those skilled in the art having read this disclosure will recognize that changes and modifications may be made to the embodiments without departing from the scope of the present invention. It should be appreciated that the particular implementations shown and described herein are illustrative of the invention and its best mode and are not intended to otherwise limit the scope of the present invention in any way. Other variations are within the scope of the following claims.

While this specification contains many specifics, these should not be construed as limitations on the scope of the invention or of what can be claimed, but rather as descriptions of features specific to particular implementations of the invention. Headings herein are not intended to limit the invention, embodiments of the invention or other matter disclosed under the headings.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, which includes the claims herein below, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of aligning tables comprising:
   determining, using a microprocessor, correspondence among i) groups in a first version of one or more groups of related tables and ii) groups in a second version of one or more groups of related tables, wherein the tables have schema and table names and the determining correspondence among groups in the first and second versions includes:
   matching groups that have matching tables, wherein the matching tables have matching schema and table names; and wherein the method includes:
      displaying a user interface on a display device, wherein the displaying includes displaying first and second portions of the user interface;
      displaying a group name list for the one or more groups of the first version in the first user interface portion;
      displaying a group name list for the one or more groups of the second version in the second user interface portion; and
      displaying a table name list of one or more tables within each respectively displayed group, wherein within each group of the first version, the one or more table names are in visual alignment with respective corresponding one or more table names of the respective corresponding group of the second version,
   wherein responsive to user selection of the first version for governing the aligning of the tables and responsive to determining, using a microprocessor, that a group in the second user interface portion corresponds to a plurality of groups in the first user interface portion, the displaying of the group names in the second user interface portion includes:
      repeating at least one group name in the group name list of the second user interface portion, wherein each repeated group name is listed together with a segment identifier as a segment, wherein each segment corresponds to one of the plurality of groups in the first user interface portion, wherein each segment in the second user interface portion is displayed in visual alignment with the segment's corresponding group name in the first user interface portion.

2. The method of claim 1, comprising:
   identifying as an added table, using the microprocessor, each table in the second version that does not have a corresponding table in the first version; and
   for each added table in the second version, inserting padding in the table name list in the corresponding group of the first version opposite the listed name of the added table in the second version, so that each added table listed within its group of the second version is displayed in visual alignment with padding in the corresponding group of the first version.

3. The method of claim 2, comprising:
   identifying as a new group, using the microprocessor, each group in the second version that does not have a corresponding group in the first version; and
   displaying each new group below the rest of the group and table names listed in the second version.

4. The method of claim 3, comprising:
   identifying as a deleted table, using the microprocessor, each table in the first version that does not have a corresponding table in the second version; and
   for each deleted table in the first version, inserting padding in the table name list in the corresponding group of the second version opposite the listed name of the deleted table in the first version, so that each deleted table listed within its group of the first version is displayed in visual alignment with padding in the corresponding group of the second version.

5. The method of claim 4, comprising:
   identifying as a deleted group, using the microprocessor, each group in the first version that does not have a corresponding group in the second version; and
   displaying each deleted group below the rest of the group and table names listed in the second version.

6. The method of claim 1, wherein responsive to the user selection of the first version for governing the aligning of the tables, displaying the table name list of one or more tables within each respectively displayed group comprises:
   displaying the group names in a predetermined sequence in the first user interface portion and displaying the group names in the second user interface portion in visual alignment with the respective names of the corresponding groups listed in the first user interface portion.

7. A system for aligning tables, comprising:
   a microprocessor coupled to a memory, wherein the microprocessor is programmed to align tables by:
   determining, using a microprocessor, correspondence among i) groups in a first version of one or more groups of related tables and ii) groups in a second version of one or more groups of related tables, wherein the tables have schema and table names and the determining correspondence among groups in the first and second versions includes:
   matching groups that have matching tables, wherein the matching tables have matching schema and table names and wherein the microprocessor is programmed to align tables by:
   displaying a user interface on a display device, wherein the displaying includes displaying first and second portions of the user interface;
   displaying a group name list for the one or more groups of the first version in the first user interface portion;
   displaying a group name list for the one or more groups of the second version in the second user interface portion; and
   displaying a table name list of one or more tables within each respectively displayed group, wherein within each group of the first version, the one or more table names are in visual alignment with respective corresponding one or more table names of the respective corresponding group of the second version, wherein responsive to user selection of the first version for governing the aligning of the tables and responsive to determining, using a microprocessor, that a group in the second user interface portion corresponds to a plurality of groups in the first user interface portion, the displaying of the group names in the second user interface portion includes:

repeating at least one group name in the group name list of the second user interface portion, wherein each repeated group name is listed together with a segment identifier as a segment, wherein each segment corresponds to one of the plurality of groups in the first user interface portion, wherein each segment in the second user interface portion is displayed in visual alignment with the segment's corresponding group name in the first user interface portion.

8. The system of claim 7, wherein the microprocessor is programmed to align tables by:

identifying as an added table, using the microprocessor, each table in the second version that does not have a corresponding table in the first version; and for each added table in the second version, inserting padding in the table name list in the corresponding group of the first version opposite the listed name of the added table in the second version, so that each added table listed within its group of the second version is displayed in visual alignment with padding in the corresponding group of the first version.

9. The system of claim 8, wherein the microprocessor is programmed to align tables by:

identifying as a new group, using the microprocessor, each group in the second version that does not have a corresponding group in the first version; and displaying each new group below the rest of the group and table names listed in the second version.

10. The method of claim 9, wherein the microprocessor is programmed to align tables by:

identifying as a deleted table, using the microprocessor, each table in the first version that does not have a corresponding table in the second version; and for each deleted table in the first version, inserting padding in the table name list in the corresponding group of the second version opposite the listed name of the deleted table in the first version, so that each deleted table listed within its group of the first version is displayed in visual alignment with padding in the corresponding group of the second version.

11. The method of claim 10, wherein the microprocessor is programmed to align tables by:

identifying as a deleted group, using the microprocessor, each group in the first version that does not have a corresponding group in the second version; and displaying each deleted group below the rest of the group and table names listed in the second version.

12. The system of claim 7, wherein responsive to the user selection of the first version for governing the aligning of the tables, displaying the table name list of one or more tables within each respectively displayed group comprises:

displaying the group names in a predetermined sequence in the first user interface portion and displaying the group names in the second user interface portion in visual alignment with the respective names of the corresponding groups listed in the first user interface portion.

13. A non-transitory computer readable storage medium having executable program stored thereon, wherein the program instructs a microprocessor to align tables by:

determining correspondence among i) groups in a first version of one or more groups of related tables and ii) groups in a second version of one or more groups of related tables, wherein the tables have schema and table names and the determining correspondence among groups in the first and second versions includes:

determining, using a microprocessor, correspondence among i) groups in a first version of one or more groups of related tables and ii) groups in a second version of one or more groups of related tables, wherein the tables have schema and table names and the determining correspondence among groups in the first and second versions includes:

matching groups that have matching tables, wherein the matching tables have matching schema and table names; and wherein the program instructs a microprocessor to align tables by:

displaying a user interface on a display device, wherein the displaying includes displaying first and second portions of the user interface;

displaying a group name list for the one or more groups of the first version in the first user interface portion;

displaying a group name list for the one or more groups of the second version in the second user interface portion; and displaying a table name list of one or more tables within each respectively displayed group, wherein within each group of the first version, the one or more table names are in visual alignment with respective corresponding one or more table names of the respective corresponding group of the second version, wherein responsive to user selection of the first version for governing the aligning of the tables and responsive to determining, using a microprocessor, that a group in the second user interface portion corresponds to a plurality of groups in the first user interface portion, the displaying of the group names in the second user interface portion includes:

repeating at least one group name in the group name list of the second user interface portion, wherein each repeated group name is listed together with a segment identifier as a segment, wherein each segment corresponds to one of the plurality of groups in the first user interface portion, wherein each segment in the second user interface portion is displayed in in visual alignment with the segment's corresponding group name in the first user interface portion.

14. The computer readable storage medium of claim 13, wherein the program instructs a microprocessor to align tables by:

identifying as an added table, using the microprocessor, each table in the second version that does not have a corresponding table in the first version; and for each added table in the second version, inserting padding in the table name list in the corresponding group of the first version opposite the listed name of the added table in the second version, so that each added table listed within its group of the second version is displayed in visual alignment with padding in the corresponding group of the first version.

15. The computer readable storage medium of claim 14, wherein the program instructs a microprocessor to align tables by:

identifying as a new group, using the microprocessor, each group in the second version that does not have a corresponding group in the first version; and displaying each new group below the rest of the group and table names listed in the second version.

16. The computer readable storage medium of claim 15, wherein the program instructs a microprocessor to align tables by:

identifying as a deleted table, using the microprocessor, each table in the first version that does not have a corresponding table in the second version; and for each deleted table in the first version, inserting padding in the table name list in the corresponding group of the second version opposite the listed name of the deleted table in the first version, so that each deleted table listed within its group of the first version is displayed in visual alignment with padding in the corresponding group of the second version.

17. The computer readable storage medium of claim 16, wherein the program instructs a microprocessor to align tables by:

identifying as a deleted group, using the microprocessor, each group in the first version that does not have a corresponding group in the second version; and displaying each deleted group below the rest of the group and table names listed in the second version.

18. The method of claim 13, wherein responsive to the user selection of the first version for governing the aligning of the tables, displaying the table name list of one or more tables within each respectively displayed group comprises:

displaying the group names in a predetermined sequence in the first user interface portion and displaying the group names in the second user interface portion in visual alignment with the respective names of the corresponding groups listed in the first user interface portion.

* * * * *